SNAP-ACTING, CYCLING, THERMOSTATIC SWITCH

Filed March 21, 1966

INVENTOR.
GEORGE W. CRISE

BY
MAHONEY, MILLER & RAMBO
BY W. H. Rambo
ATTORNEYS

SNAP-ACTING, CYCLING, THERMOSTATIC SWITCH

Filed March 21, 1966 2 Sheets-Sheet 2

INVENTOR.
GEORGE W. CRISE

BY
MAHONEY, MILLER & RAMBO
BY W. S. Rambo
ATTORNEYS 3,418,617

SNAP-ACTING, CYCLING, THERMOSTATIC SWITCH

George W. Crise, P.O. Box 367, Danville, Ohio 43014

Filed Mar. 21, 1966, Ser. No. 535,993
8 Claims. (Cl. 337—368)

ABSTRACT OF THE DISCLOSURE

A snap-acting thermostat in which the normal gradual thermal flexing movement of a bimetal or other thermally responsive member is yieldably resisted by a friction-inducing member arranged to apply a substantial static frictional force to the thermally responsive member in all positions of thermal movement of the latter, thereby to cause the thermally responsive member to move with snap action from any one position to another.

The present invention relates generally to thermostatic switches and more specifically to an improved snap-acting, thermostatic switch which is particularly useful as a control for an electrical heating device such as a bed-warming pad or blanket.

As is well known, snap action in the opening and closing movement of a pair of switch contacts is highly desirable to minimize arcing and consequent premature wear and erosion of the contact points. Also, in the thermostatic switches snap action in the opening and closing of the contact points tends to stabilize the cycling of the switch and minimizes undesirable "hunting" or "flutter" between the relatively movable switch contact points.

In the past, it has been proposed to employ spring-biased latch means, as well as magnets, to yieldably resist opening and closing movement between the switch contacts of a thermostatic switch until sufficient energy has been stored or "built-up" in the thermally responsive element of the switch to overcome the biasing force of the magnet or latch means and thereby permit the switch contacts to snap between their open (spaced apart) and closed (engaged) positions. By and large, however, snap-acting thermostatic switches which incorporate either magnets and/or spring-biased latch means to accomplish the desired snap action are comparatively expensive, structurally complex, and/or bulky and cumbersome in construction.

Accordingly, it is the principal object of this invention to provide an improved snap-acting thermostatic switch of comparatively simplified, economical and compact construction, and one which is particularly adapted for use as an adjustable temperature control for an electrical heating device such as a bed-warming pad or blanket.

Another object is to provide a snap-acting thermostatic switch in which the movement of a pair of circuit-controlling contacts between open and closed positions in response to the normal thermally induced movements of a thermally responsive member, such as a bimetal strip, is yieldably resisted by a static frictional force which functions to initially hold the thermally responsive member in either circuit-making or breaking positions until sufficient stress is placed on the thermally responsive member to overcome such frictional force and cause it to snap from one position to the other.

A further object of this invention is to provide a snap-acting thermostatic switch of the aforementioned character which also incorporates therein a simple and efficient heat-anticipating means by which the inherent time delay or lag in the operation of the thermally-responsive member in response to an increase of ambient temperatures may be overcome.

Still another object of the present invention is to provide an improved snap-acting thermostatic switch which may be used to efficiently control the operation of a dual voltage electrical heating appliance, such, as, for example, an electrical heating pad designed to operate on either 115 volts A.C. household circuits or 12 volts D.C. automobile battery circuits.

For a further and more detailed understanding of the present invention and the various additional objects and advantages thereof, reference is made to the following description and the accompanying drawing, wherein.

Figure 1:
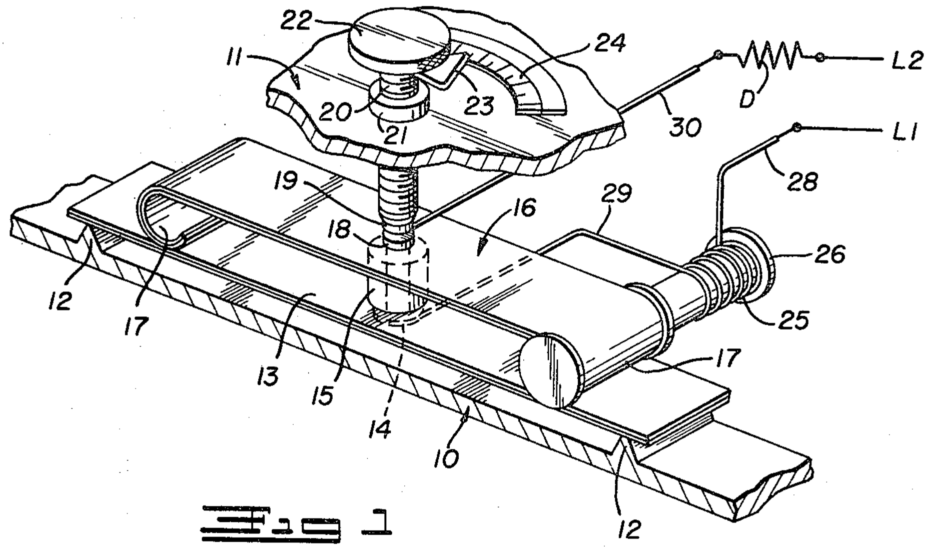
FIG. 1 is a schematic perspective view showing the fundamental structural elements of a thermostatic switch according to the present invention.

Referring now to the drawing, FIG. 1 illustrates a preferred form of thermostatic switch constructed in accordance with the present invention. This switch comprises a box-like outer casing or enclosure which, for purposes of simplicity of illustration, is shown in fragmentary form in FIG. 1 as comprising an inner or bottom wall 10 and a relatively spaced outer or top wall 11. It should here be understood that the specific shape and constructional details of the outer casing or switch enclosure are of no particular importance in the present invention, other than to provide for the proper support and protection of the "working" parts of the switch mechanism. Preferably, the outer casing is of sectional, molded plastic construction, and the bottom wall 10 may be formed with integral, knife edge bearing supports 12 on which are movably supported the outer end portions of an elongated bimetal strip 13 which constitutes the main thermally responsive member of the switch. The particular knife edge bearing supports 12 as shown in FIG. 1 are for purposes of illustration only, and it should be understood that they may be replaced by any other suitable structure which will support the end portions of the strip 13 and permit of free flexing or deflection of the central portion of the bimetal strip 13 within a given operating range of movement, and in response to variations in ambient temperatures.

The bimetal strip 13, as viewed in the drawing, is constructed so that it is substantially straight at a given average room temperature of say 70° F. The high expansion side of the strip 13 faces downwardly so that the central portion of the strip 13 will flex or bow downwardly in response to an increase of ambient temperatures. Extending through the central portion of the bimetal strip 13 is an electrically conductive, metal rivet 14 which projects upwardly above the central portion of the strip 13 and through the axial bore of a cylindrical spacer post or block 15. The upper end of the rivet 14 extends through an opening formed in the central portion of a resiliently flexible, friction-imparting strip or member 16, and secures the member 16 and spacer post 15 to the bimetal strip 13 to provide a unitary assemblage. As will be noted, the friction-imparting member 16 is also preferably formed from a bimetal strip having opposite end portions curved downwardly and inwardly to provide substantially cylindrical bearing surfaces 17 at each end of the member 16 which are in frictional contact with the main bimetal strip 13. In the assembly of the friction-imparting member 16 on the post 15 and rivet 14, the member 16 is placed under predetermined tension, so that the curved bearing surfaces 17 at each end thereof will bear, with some pressure, against the bimetal strip 13. This is easily accomplished by bending or otherwise forming the member 16 so that the central or intermediate portion thereof is initially bowed or curved upwardly above the level of the end bearing surfaces 17, and, upon assembly with the rivet 14, is drawn downwardly and held in a substantially straight line, thus placing the cylindrical bearing surfaces 17 under a downwardly directed bias against the strip 13. As will be apparent, the degree of resilient tension of the friction-imparting member 16 against the bimetal strip 13 governs, to a great extent, the force or strength of the snap-action of the switch. Thus, when the switch is to be used to control a relatively high amperage circuit, the friction-imparting member 16 is placed under relatively higher resilient tension than when the switch is to be used to control a comparatively low amperage circuit.

The upper end of the rivet 14 is electrically connected with a first contact point 18 which is preferably formed from a suitable precious or semiprecious metal alloy, or which is plated with a precious or semiprecious metal, such as platinum or silver. The lower headed end of the rivet 14 may thus be employed as a connector terminal for the switch contact point 18. The switch further includes an adjustable contact point 19 disposed in axial alignment with the first contact point 18 and movable axially relative thereto by means of an adjustment screw 20. As illustrated in FIG. 1, the screw 20 is threadedly engaged with and extends through a threaded bushing 21 carried by the upper wall 11 of the switch casing. The screw 20 terminates at its upper end in an adjustment knob 22 which is provided with an indexing pointer 23 disposed in registry with a graduated, temperature-selection scale 24 formed on the upper wall of the switch casing. Thus, by turning the screw 20 in opposite directions, the adjustable switch contact point 19 may be moved toward or from the contact point 18.

If desired, the present thermostatic switch may incorporate one or more heat-anticipating units which function to modify the normal operation of the main thermally responsive member of the switch so as to compensate for the inherent lag in the opening of the switch circuit in response to an increase in ambient temperatures. Toward this end, the thermostatic switch shown in FIG. 1 of the drawing is provided with a low resistance heating coil 25 which is wound about the outer end portion of a thermally conductive metal spool 26 formed from brass, copper or the like. The inner end portion of the spool 26 is partially encompassed by and held within the substantially cylindrical bearing surface 17 formed at one end of the friction-imparting strip 16. Thus, when heat is generated in the heating coil 25 a proportion of this heat will be conducted through the spool 26 to the looped end portion 17 of the friction-imparting strip 16 and thence, by conduction, to the relatively contacting surface of the main bimetal strip 13. As indicated diagrammatically in FIG. 1, the heating coil 25 is electrically connected in series with the contact points 18 and 19 of the thermostatic switch and with the electrical heating device D whose operation is controlled by the switch. Operating current is supplied through the lead lines L1 and L2. One end of the heater coil 25 is connected with the power supply line L1 by a remotely extending lead wire 28, while the opposite end of the coil 25 is connected, by way of the lead wire 29, to the metal rivet 14 and the contact point 18 carried thereby. The adjustable contact point 19 is suitably electrically connected with the electrical heating device (load) D by a remotely extending lead wire 30, and the opposite end of the heating device is connected with the opposite power line L2 to complete the series circuit.

Figures 2, 5, 6:
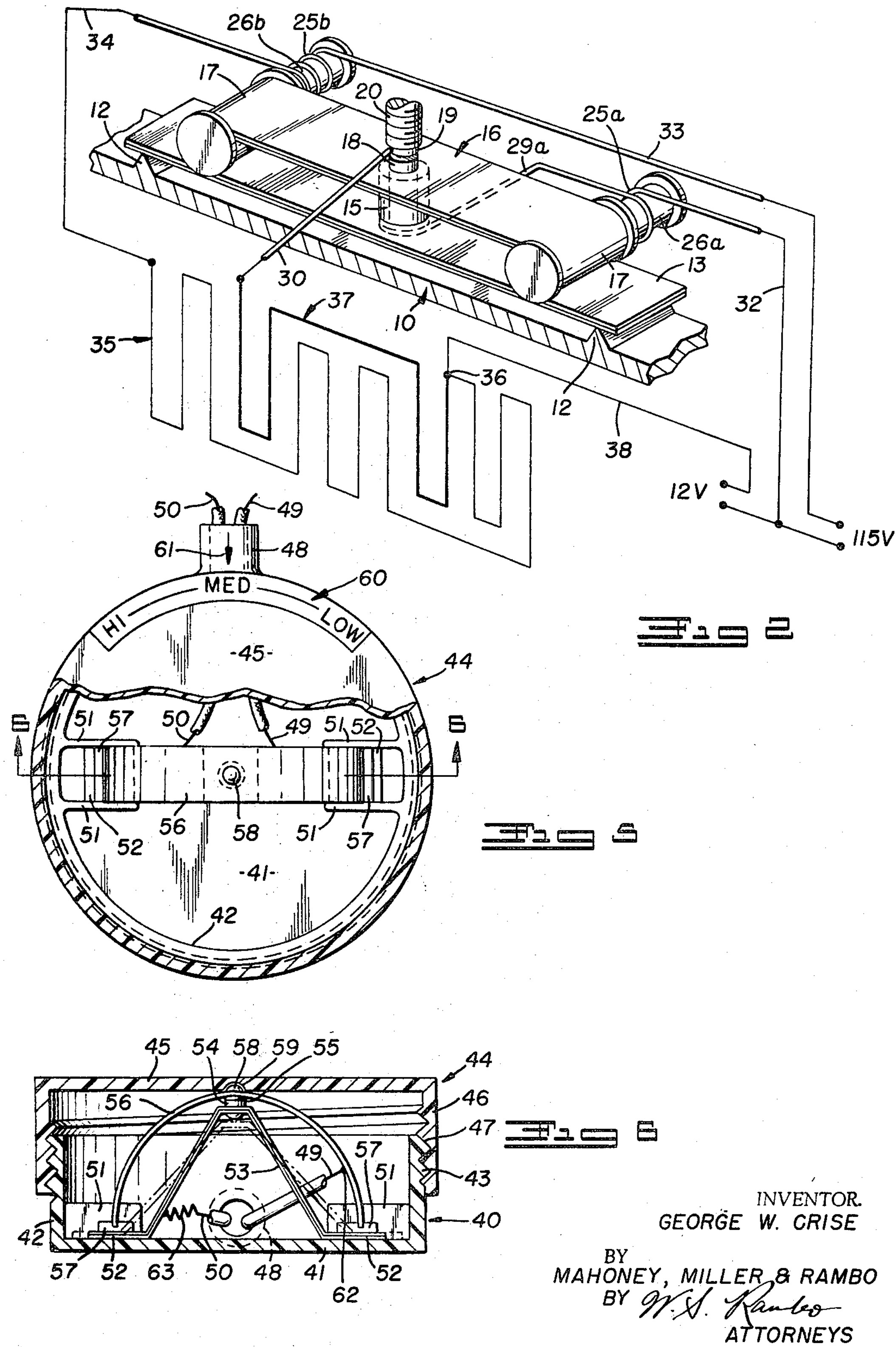
FIG. 2 is a similar view of a modified form of thermostatic switch which is designed for use in combination with dual voltage electrical heating appliances.
FIG. 5 is a top plan view, partially in horizontal section, showing another modified form of thermostatic switch embodying this invention.
FIG. 6 is a transverse vertical sectional view taken along the line 6—6 of FIG. 5.

FIG. 2 of the drawing illustrates a slightly modified form of the present thermostatic switch which is particularly suited for use in controlling a dual voltage heating device, such as an electrical heating pad or blanket intended for both household and camping usage and which may be operated on either a 115 volt A.C. household circuit, or on 12 volt D.C. automobile battery or generator circuits. As will be noted, the construction of the dual voltage switch shown in FIG. 2 is identical with that of FIG. 1 with the single exception that both of the curved or looped bearing surfaces 17 of the friction-imparting strip 16 are provided with thermally conducting spools **26*a* and 26*b* around which are wound the low resistance heating coils 25*a* and 25*b*, respectively. In the electrical circuit shown in FIG. 2, the heating coil 25*a* is of lower resistance than the coil 25*b*, and one side of the coil 25*a* is connected by a remotely extending lead wire 32 with the common terminal of a dual voltage electrical connector plug having two sets of connector prongs or terminals indicated by the numerals 12 v. and 115 v., respectively. The opposite end of the heating coil 25*a* is connected by the lead wire 29*a* to the rivet 14. The other heater coil 25*b* has one end connected with one of the 115 v. terminals of the connector plug by way of the remotely extending lead wire 33. The opposite end of the heater coil 25*b* is connected by a lead wire 34 with one end of a high voltage winding or grid 35 of a flexible heating pad or blanket. The opposite end of the high voltage heating grid 35 is connected, as at 36, with one end of a low voltage heating grid 37 (heavy lines, FIG. 2) whose convolutions may be advantageously interspersed between convolutions of the high voltage grid 37 within the covering of the heating pad or blanket, not shown. The opposite end of the low voltage grid 37 is electrically connected with the switch contact point 19 by means of the lead wire 30. A remotely extending lead wire 38 is connected at the junction 36** of the high and low voltage grids and extends to the low voltage connector prongs 12 v.

In the operation of the circuit of FIG. 2, assuming that the low voltage terminals 12 v. are "plugged into" an appropriate power source, an operating circuit is established first through lead wire 32, heater coil **25*a*, lead wire 29*a*, switch contact points 18 and 19, lead wire 30, low voltage grid 37, lead wire 38 and back to terminal prongs 12 v. A high voltage operating circuit is established first from connector prongs 115 v., lead wire 33, heater coil 25*b*, lead wire 34, high voltage grid 35, low voltage grid 37, lead wire 30, switch contacts 19 and 18, lead wire 29*a*, heater coil 25*a*, lead wire 32** and back to terminal prongs 115 v.

Figure 3:
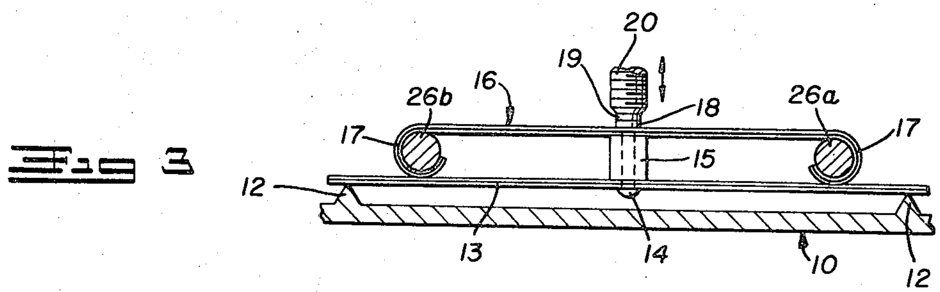
FIG. 3 is a diagrammatic side elevational view showing the circuit-controlling contacts of the switch of FIG. 2 in closed (engaged) position.
Figure 4:
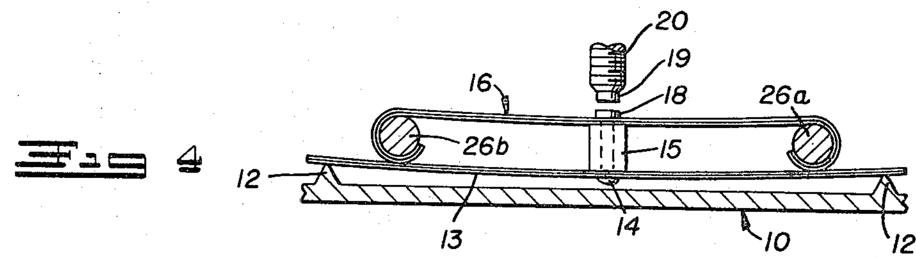
FIG. 4 is a similar view showing the circuit-controlling contacts in open position in response to increased temperature conditions of the thermally responsive bimetal strip.

As will be understood, the primary function of the friction-imparting strip 16 in both species of switch, as disclosed in FIGS. 1 and 2, is to frictionally, but yieldably, resist thermal flexing or warping of the main bimetal strip 13. FIGS. 3 and 4 illustrate the relative movement of the strips 13 and 16 during circuit opening and closing operations of the switch. In FIG. 3, the switch contact points 18 and 19 are closed (engaged). This causes energization of the electrical heating pad or blanket D (FIG. 1), or the high and/or low voltage heating grids 35 or 37 (FIG. 2). At the same time, the heater coil 25 (FIG. 1), or **25*a*, 25*b* (FIG. 2) is energized to transmit heat to the associated thermally conductive spool 26, 26*a*, or 26*b*, thence to the curved end portions 17 of the strip 16 and ultimately to the main bimetal strip 13. As the temperature of the bimetal strip 13 increases, due either to an increase in ambient air temperature, or to heat generated by the heater coil 25, etc., the central portion of the strip 13 tends to bow downwardly to thus separate or open the contact points 18 and 19 of the switch. However, before the bimetal strip 13 can bow or deflect downwardly, the static friction imposed thereon by the curved bearing surfaces 17 of the friction strip 16 must be overcome to permit the strip 13 to slide against the bearing surfaces 17. This sliding movement at the points of engagement of the friction strip 16 with the bimetal strip 13 is necessitated due to the radially offset relation of the two strips and the fact that their control portions are rigidly joined to one another by the rivet 14 and spacer post 15**.

Thus, separation of the contacts 18 and 19 is delayed unitl sufficient energy is built up in the bimetal strip 13 to overcome the static friction force imparted by the strip 16, at which time the bimetal strip and its associated contact point 18 will spring or snap downwardly to the position shown in FIG. 4, to open the circuit controlled by the switch. By the same token as the bimetal strip 13 starts to flex upwardly toward a circuit closing position in response to a decrease of temperature, the same static friction imposed by the strip 16 must be overcome to permit the bimetal strip to return to the FIG. 3 position. Thus, the contact point 18 is caused to "snap" suddenly in its movement both toward as well as away from the opposite switch contact 19.

The amount of power required to produce the snap action on the part of the main bimetal strip 13 depends primarily upon the pressure exerted upon the strip 13 by the friction-imparting strip 16, as well as the heat energy supplied by the heating coil 25. Thus, where a strong snap action is required or is desirable, such as when the switch is employed to control a relatively high amperage circuit, the friction-imparting strip 16 is initially assembled on the post 15 under a higher degree of resilient flexure than when a lighter snap action and a more rapid cycling is desired, such as in controlling a relatively lower amperage circuit.

It should be understood that while the friction-imparting strip 16 s preferably of bimetallic construction, this is not essential, and the strip 16 may take the form of a single ply or layer of spring steel or the like. However, as indicated, a friction-imparting strip 16 of bimetallic construction gives the added advantage of being able to vary the amount of force or pressure exerted by the strip 16 on the main bimetal strip 13 in response to the amount of heat energy supplied thereto by one or more of the heating coils 25, **25*a*, or 25*b*. FIGS. 5 and 6 illustrates another modified form of thermostatic switch having friction-induced snap action according to the present invention. This particular switch comprises a relatively flat, cylindrical outer casing preferably formed from molded plastic material, and formed in two threadedly connected sections. The lower or base section 40 of the casing includes a flat, circular bottom wall 41 and an annular side wall 42 formed with an externally screw-threaded region 43. The upper section 44 of the casing includes a flat, cylindrical top wall 45 and an annular, depending side wall 46 having an internally screw-threaded region 47 threadedly engaged with the cooperating screw-threaded region 43 of the base section. The base section 40 is formed to include a tubular conduit boss 48 through which the lead wires 49 and 50 may extend into the interior of the casing. The base section 40 is formed interiorly with diametrically opposed sets or pairs of guide walls 51. The guide walls 51 extend upwardly from the bottom wall 41 and radially inwardly from the side wall 42, and define a pair of diametrically opposed, inwardly and upwardly opening guide channels to slidably receive the outwardly turned feet 52 of a generally inverted V-shaped bimetal strip 53. The bimetal strip 53 bridges the central portion of the casing and is provided at its upper central region with an electrical contact point 54. The bimetal strip 53 has its high expansion side facing downwardly, so that the strip tends to flatten in response to an increase of temperature, as illustrated by broken lines in FIG. 6. This flattening or spreading movement of the strip 53 in response to heat causes the outwardly turned feet 52 of the strip to slide outwardly on the bottom wall 41 of the lower casing section 40 and causes the contact point 54** to descend to a lower level in the casing.

Disposed in vertical alignment with the contact point 54 is a second contact point 55 carried by and depending from the central portion of an arcuately curved, bow spring 56 formed from brass or other electrically conductive metal or alloy. The bow spring 56 is disposed generally in a common vertical plane with the bimetal strip 53 and terminates in opposite ends to each of which is attached a dielectric plastic insulator block 57. Preferably, the contact 55 is electrically connected with the spring 56 by means of a rivit 58 which is disposed in alignment with and is received within a small recess or depression 59 formed in the upper wall 45 of the upper casing section 44. As will be readily apparent from FIG. 6, the spacing or pressure between the switch contacts 54 and 55 may be adjusted or varied, to cause opening or closing thereof at relatively higher or lower ambient temperatures, simply by screwing the upper section 44 of the casing downwardly or upwardly on the lower or base section 40. In other words, in the initial assembly of the switch, the upper casing section 44 is threaded onto the lower casing section 40 until the recess or depression 59 engages the rivet 58 under comparatively light pressure. At this time the switch may be calibrated and an appropriate indicator scale 60 is applied to the exterior top wall 45 of the upper casing section to register with a fixed index pointer 61 on the conduit boss 48. If desired, after calibration and indexing of the switch, the respective upper and lower casing section 40 and 44 may be provided with appropriate stop means, not shown, to limit relative rotation of the upper and lower casing sections within the arcuate range of the indicator scale 60.

The electrical circuit of the switch of FIGS. 5 and 6 includes a direct electrical connection, as at 62, between the lead wire 49 and the bow spring 56. The second lead wire 50 is electrically connected with one end of a relatively low resistance heat-anticipating coil 63, and the opposite end of the coil 63 is electrically connected with a lower limb of the bimetal strip 53. The heating coil 63 is located adjacent and in thermal proximity to the bimetal strip 53, thus making the strip 53 responsive to heat generated in the coil 63. Hence, the coil 63 is in series circuit with the contact points 54 and 55 and will be heated upon closure of the contact points 54 and 55 when the switch is connected in an electrical operating circuit, such as is shown in FIG. 1 of the drawings.

In addition to functioning as an adjustable support for the contact point 55, the bow spring 56 acts as a friction-inducing means to yieldably resist the normal thermal flexing movement of the bimetal strip 53, and thus cause the bimetal strip to move with snap action in both circuit-opening and circuit-closing directions. Thus, it will be seen that as the spring 56 is placed under resilient compression by the upper casing section 44, the spring 56, in turn, applies a downwardly acting force to the insulator blocks 57 resting upon the feet 52 of the bimetal strip 56. This places the feet 52 of the bimetal strip under pressure between the blocks 57 and the bottom wall 41 of the lower casing section 40. At the same time, in order for the bimetal strip to flex in response to temperature variations, it is necessary that the feet 52 of the strip slide inwardly or outwardly on the bottom wall 41 of the casing section 40. Thus, before the feet 52 can slide on the bottom wall 41, sufficient energy must be generated in the bimetal strip to overcome the static friction between the feet 52 and the bottom wall 41. This results in a sudden or snap action movement of the bimetal strip and its associated contact point 54 in both circuit-opening and closing direction.

In view of the foregoing, it will be seen that the present invention provides an improved snap-acting switch of comparatively simple, yet mechanically efficient construction and wherein the desired snap action is obtained by overcoming a predetermined static friction imposed on the thermally responsive member of the switch. The present thermostatic switch is further characterized by a "built-in" heat anticipating unit which enables the switch to overcome the inherent lag in response of the thermally-responsive member of the switch to variations of ambient temperature.

While presently preferred embodiments of the present invention have been illustrated and described in detail, it will be understood that various modifications as to design and details of construction may be resorted to without departing from the spirit of the invention or the scope of the following claims.

Having thus described this invention, what is claimed is:

1. In a thermostatic switch; a pair of relatively movable switch contacts; an elongated, thermally responsive bimetal strip having an intermediate portion arranged for thermal flexing movement in opposite directions in response to variations in the temperature thereof; means supporting said bimetal strip at the opposite end portions thereof and permitting longitudinal sliding movement of each opposite end portion of said bimetal strip thereon; means connecting one of said switch contacts for movement with the intermediate portion of said bimetal strip; and a resiliently flexible, friction-inducing strip having opposite end portions bearing against the opposite end portions of said bimetal strip and applying a substantial static frictional force to the opposite end portions of said bimetal strip in all positions of thermal movement of the latter, said friction-inducing strip being arranged to yieldably resist thermal flexing movement of said bimetal strip until sufficient energy is generated in said bimetal strip to temporarily overcome the static frictional force applied thereto by said friction-inducing strip whereby to cause said bimetal strip to move with a sudden snap action from one position to another.

2. A thermostatic switch according to claim 1, wherein said friction-inducing strip comprises a second bimetal strip having an intermediate portion connected to and movable with the intermediate portion of said first-named bimetal strip.

3. A thermostatic switch according to claim 1, wherein said friction-inducing strip terminates in curved outer end portions which slidably bear against the opposite end portions of said bimetal strip in all positions of thermal movement of the latter.

4. A thermostatic switch according to claim 1, wherein said bimetal strip is of generally inverted V-shape having outwardly turned opposite end portions, and said friction-inducing strip comprises a resilient bow spring having opposite end portions bearing against the outwardly turned opposite end portion of said bimetal strip.

5. A thermostatic switch according to claim 1, including an electrical heating element connected in series with said switch contacts and arranged to transmit heat to said bimetal strip upon closure of said switch contacts.

6. A thermostatic switch according to claim 2, including a pair of electrical heating elements of respectively different resistance characteristics each disposed in thermal proximity to second bimetal strip and arranged to transmit heat thereto upon closure of said switch contacts.

7. A thermostatic switch according to claim 3, wherein at least one of the curved outer end portions of said friction-inducing strip has associated therewith a thermally conductive rod member and an electrical heating element wound about said rod member and connected in series with said switch contacts, said heating element being energizable upon closure of said switch contacts to transmit heat to said rod member and thence to said friction-inducing strip.

8. A thermostatic switch control for a dual voltage, electrical heating device having high and low voltage heating circuits, said switch control comprising a pair of relatively movable switch contacts; a first thermally responsive bimetal strip having an intermediate portion connected with one of said contacts and opposite end portions extending outwardly from the intermediate portion thereof; means supporting said first bimetal strip toward the opposite end portions thereof and providing for thermal flexing movement of the intermediate portion thereof in opposite directions in response to variations in the temperature thereof; a second, resiliently flexible bimetal strip having an intermediate portion secured in relatively spaced relation to the intermediate portion of said first bimetal strip and opposite end portions bearing against and applying a substantial static frictional force to the opposite end portions of said first bimetal strip in all positions of thermal movement thereof, said bimetal strips being arranged to necessitate relative sliding movement between the end portions of said strips upon thermal flexing movement of said first bimetal strip in either direction and to thereby yieldably resist thermal flexing movement of said first bimetal strip until sufficient energy is generated therein to temporarily overcome the static frictional force applied thereto by said second bimetal strip; a first electrical resistance electrically connected in the low voltage circuit of said heating device and disposed in thermal proximity to said bimetal strips and operable to heat the latter upon energization of the low voltage circuit of said heating device; and a second electrical resistance connected in the high voltage circuit of said heating device and disposed in thermal proximity to said bimetal strips and operable to heat the latter upon energization of the high voltage circuit of said heating device.

References Cited

UNITED STATES PATENTS

| | | | |
|---|---|---|---|
| 2,579,389 | 12/1951 | Mertler | 200—138 |
| 1,219,516 | 3/1917 | Whittelsey | 73—363.5 X |
| 1,464,756 | 8/1923 | Feuser et al. | 73—363.1 X |
| 1,726,748 | 9/1929 | Matthews | 73—363.5 X |
| 1,733,085 | 10/1929 | Thomas | 73—363.5 X |
| 2,644,873 | 7/1953 | Vroom et al. | 73—363.5 X |
| 2,794,884 | 6/1957 | Shaw et al. | 200—138 |
| 3,004,203 | 10/1961 | Epstein | 200—122 X |
| 3,107,532 | 10/1963 | Lingau | 200—138 X |

BERNARD A. GILHEANY, *Primary Examiner.*

R. L. COHRS, *Assistant Examiner.*

U.S. Cl. X.R.

337—270